Patented July 14, 1953

2,645,623

UNITED STATES PATENT OFFICE 2,645,623

MANUFACTURE OF SYNTHETIC RESINS FROM PHENOLS AND ALDEHYDES AND OF POLYPHENOLS THEREFOR

Friedrich Jakob Hermann, Seine, France, assignor to Reichhold Chemicals, Inc., Detroit, Mich.

No Drawing. Application October 4, 1950, Serial No. 188,488. In the Netherlands October 14, 1949

14 Claims. (Cl. 260—19)

The invention relates to improvements in synthetic resins and in the method of making the same from products containing more than one phenolic nucleus per molecule.

It is well known that isocyanates produce addition reactions with products possessing active, i. e. hydrogen atoms that can be replaced by sodium. As examples may be mentioned: the reaction between isocyanates and products containing hydroxyl-, amine- and carboxyl groups, resulting respectively in urethanes, substituted urea and probably substituted amides and acid anhydrides. It is known that when reacting compounds containing more than one active hydrogen atom with di- or polyisocyanates, poly-addition products are formed that, depending on the functionality of the reacting compounds, are characterized by formation of chain molecules or three dimensionally built molecular structures. Such materials may be used for the production of fibres, synthetic rubbers, paints, glue, moulding powders, etc.

Among the compounds with hydroxyl groups, polyvalent alcohols are particularly useful as raw materials for the production of urethanes which may be used for the above mentioned technical purposes. The literature mentions in addition the use of compounds with phenolic hydroxyl groups and particularly of condensation products from phenol and aldehyde (U. S. Patent No. 2,349,756, BIOS Final Report #1498, Item #22).

The results, however, obtained when reacting polyisocyanates with phenols, containing only phenolic hydroxyls as active groups or in addition also other active groups are not satisfactory in all respects. On the one hand the reaction does not proceed far enough, on the other hand the properties of the reaction products are not as desired. Polyvalent phenols, as for instance pyrocatechol, react generally insufficiently unless special catalysts, for example AlCl3, are added. The mechanical properties are not such as to produce useful products, such as fibres and paints.

The addition products from poly-isocyanates and the condensation products of phenols and aldehydes (active groups are here phenolic and alcoholic hydroxyl groups) generally have a more solid structure and result in the formation of compact layers. In this case it is possible by choosing the right isocyanates to make layers with a good flexibility. For many products this flexibility is not sufficient so that generally the reaction products have to be used in combination with plasticizers. One of the disadvantages of the use of plasticizers is that the useful properties that are characteristic for poly-urethanes will more or less be lost.

I have found that new synthetic materials may be prepared that possess very good mechanical properties without the addition of plasticizers and that in consequence possess the valuable chemical properties of the original condensation products if special phenols, containing or not containing other reactive groups besides the phenolic hydroxyl groups, are reacted with poly-isocyanates. These new synthetic materials are prepared by reacting phenols containing at least 2 phenolic nuclei in a molecule which nuclei are separated by chains containing at least 5 and preferably at least 9 atoms with poly-isocyanates. Preferably the phenols contain at least 3 phenolic nuclei. Mixtures containing such phenols or in addition also other phenols with the condition only that on the average per molecule the number of phenolic nuclei is at least 1.5 or preferably more than 2, may be used as well. Depending on the number of phenolic nuclei per molecule, these phenols may be called biphenols or polyphenols. Poly-isocyanates as used herein denominate molecules with at least 2 isocyanate groups.

It is known that the atoms of a molecule chain generally possess a certain flexibility with regard to each other, and that in consequence compounds containing such chains also have a certain flexibility. It appears now that the flexibility of the molecules of the poly-phenols is effective also in the reaction with poly-isocyanates.

It is possible to differentiate between reaction products from poly-isocyanates and bi-phenols and reaction products from poly-isocyanates and poly-phenols. The first group that, depending on the kind of reacting molecule, are more or less suitable for the manufacture of fibres, possess already the advantage of combining good mechanical and chemical properties; they are often surpassed however, by the reaction products from poly-phenols with corresponding poly-isocyanates. The reaction products from bi-phenols are more or less sensitive to the influence of certain solvents, this resulting probably from the fact that between the chains only Van der Waalse forces are active which forces are disturbed by solvents. Resins prepared from poly-phenols are more densely built and in consequence more resistant against such influences. For this reason the presence of phenols containing at least 3 phenolic nuclei is preferred.

The bi- and poly-phenols that can be used as raw materials may be manufactured in different ways; in principle by reacting phenol with compounds that contain more than one place in the molecule that is reactive against phenols, and which places should be separated by a sufficient number of chain molecules. Such compounds may be found in the class of polyolefins, of low molecular polymerization or condensation products of vinyl derivatives or butadiene, of poly-carboxylic acids, or unsaturated ketones or of unsaturated carboxylic acids. Most important for the productive preparation of bi- and poly-phenols are combinations of the last named group, i. e. carboxylic acids, as these products are easily available. Examples are linseed oil fatty acids, oiticica oil fatty acids, oleostearic acid, castor oil acids, tall oil fractions containing fatty acids, oleic acid, etc. For this reason the preparation of bi- and poly-phenols starting with these raw materials may be briefly described.

The unsaturated acid or a mixture of unsaturated carboxylic acids are, in the presence of a catalyst, reacted with phenol. Suitable catalysts are for instance $ZnCl_2$ or $BF_3$. It is possible to use different catalysts one after another. At least one, generally more, molecules of phenol are used per carboxylic group. Reaction takes place at normal or elevated temperature, depending on different factors that should be determined experimentally. In this connection the following factors may be mentioned as illustrative, the amount and the kind of catalysts and the reactivity of the compound. The optimal temperatures for reaction differ for the different catalysts and the length of the chains that separate the phenolic nuclei depends on the kind of acids used. The reaction is continued until condensation products are obtained that have an acid value not higher than 50, preferably below 40, a saponification value of not more than 90, preferably below 80 or even 65, and a hydroxyl value of at least 90, preferably more than 100 or even more than 120. It is advantageous to make use of mixtures of fatty acids that contain acids having more than one unsaturated linking, in this case the chance to get a condensation product with a denser molecule is greater, leading to the advantages mentioned.

Natural products or derivatives as for instance polymerization products of cashew nut shell liquid that contain at least 2 phenolic nuclei may be used. The advantages noted are found not only in using bi- and poly-phenols that contain only phenolic hydroxyl groups as active groups but that also contain in addition, especially when using bi- or poly-phenols, other active groups, as for instance condensation products of these phenols with aldehydes, or poly-phenols with active nitrogen containing groups in the nucleus or in a chain.

Examples of poly-isocyanates that may be used are:

Toluylene-di-isocyanate
Hexamethylene-di-isocyanate
Triphenyl-methane-tripara-isocyanate Known procedures are used for the production of the here described synthetic resins.

It is possible for instance to react the components at normal temperature with each other. Often, however, elevated temperatures will be used, for instance 120° C., while temperatures up to 200° C. are possible. It is possible to add certain agents like benzoylperoxide or certain metal compounds as the oil soluble metal salts of fatty acids that are used as driers in the paint industry.

Condensed isocyanates as for instance the dimeric toluylene-di-isocyanate may be used. It is possible to mix the components in a solvent that itself is chemically inert.

The products prepared according to this art may be used for different products as for instance for the production of paints and varnishes, and in moulding powders. As a matter of fact plasticizers may be added to the products described herein, but in practice and for special purposes very small quantities will be added in a few cases only.

Example 1

To a solution of 5 parts by weight of poly-phenols prepared from phenol and a linseed oil fatty acid (A. V. 6, S. V. 30, H. V. 157, molecular weight 1130; average number of phenolic nuclei 3.1) in 5 parts of toluene 2.5 parts of toluylene-di-isocyanate are added under agitation. The solution may be used during 8 hours. If the solution is applied on tin with a thickness normal for lacquers, and stoved during 1 hour at 110° C., a hard layer is obtained that is elastic to such a point that the tin may be bent 180° without cracks appearing. When immersed in a 50% solution of KOH, even after 3 days there are no obvious changes.

Example 2

100 parts by weight of a poly-phenol prepared from phenol and linseed oil fatty acids (A. V. 0.2, S. V. 13, H. V. 189; molecular weight 1220; average number of phenolic nuclei 4.1) 100 parts by weight of formaline, 180 parts by weight of butanol, 20 parts by weight of a 50% solution of NaOH are boiled during 3 hours under reflux. The product is neutralized and water and butanol are distilled off in vacuum.

5 parts by weight of the resin obtained are dissolved in 5 parts of toluene and filtered. To this solution 5 parts of hexamethylene-di-isocyanate are added. The product is applied to tin and stoved during one hour at 110° C. The layer thus obtained is glossy and cannot be scratched with a nail. It does not crack when bent at 180° and does not show deterioration after an attack of a 50% solution of KOH or of benzene during several days. The adhesion is very good.

The product just described may, if more concentrated, be used as a glue or a jointing paste.

I claim:

1. A process for the manufacture of resinous compositions which comprises reacting (1) a phenolic body comprising a poly-phenol containing at least 3 phenolic nuclei separated by chains of at least 5 atoms, and prepared from phenol and an unsaturated fatty oil carboxylic acid, with (2) an organic poly-iso-cyanate containing no other reactive group.

2. A process according to claim 1, wherein the phenolic nuclei are separated by chains of at least 9 carbon atoms.

3. A process according to claim 1, wherein the poly-phenol contains 3 phenolic nuclei.

4. A process according to claim 1, wherein substance (1) comprises a mixture of phenols with an average number of phenolic nuclei of at least 1.5.

5. A process according to claim 1, wherein substance (1) comprises a mixture of phenols with an average number of phenolic nuclei of at least 2.

6. A process as set forth in claim 1, wherein substance (1) comprises a mixture of phenols having as an average 3.1 phenolic nuclei.

7. A process as set forth in claim 1, wherein substance (1) comprises a mixture of phenols having as an average 4.1 phenolic nuclei.

8. A process as set forth in claim 1, wherein the poly-phenol employed is formed by reacting phenol with linseed oil fatty acids.

9. A process as set forth in claim 1, wherein the reaction is carried out in the presence of an inert organic solvent.

10. A process as set forth in claim 1, wherein the poly-iso-cyanate is toluylene-di-iso-cyanate.

11. A process as set forth in claim 1, wherein the poly-iso-cyanate employed is hexamethylene-di-isocyanate.

12. A process as set forth in claim 1, wherein the poly-iso-cyanate is triphenyl-methane-tri-para-iso-cyanate.

13. A process for the manufacture of a resinous composition which comprises reacting 5 parts by weight of a poly-phenol derived from phenol and linseed oil fatty acids with 2.5 parts of toluylene di-iso-cyanate in the presence of toluene.

14. A resinous composition produced according to claim 1.

FRIEDRICH JAKOB HERMANN.

References Cited in the file of this patent

UNITED STATES PATENTS

| Number | Name | Date |
|---|---|---|
| 2,059,260 | Long et al. | Nov. 3, 1936 |
| 2,279,745 | Stevenson | Apr. 14, 1942 |
| 2,284,637 | Catlin | June 2, 1942 |
| 2,374,576 | Brubaker | Apr. 14, 1945 |